(12) United States Patent
Min et al.

(10) Patent No.: US 12,299,187 B2
(45) Date of Patent: May 13, 2025

(54) DETECTION OF FACIAL EXPRESSIONS

(71) Applicant: Nokia Technologies Oy, Espoo (FI)

(72) Inventors: Chulhong Min, Trumpington (GB);
Alessandro Montanari, Cambridge (GB); Fahim Kawsar, Cambridge (GB); Akhil Mathur, London (GB)

(73) Assignee: Nokia Technologies Oy, Espoo (FI)

( * ) Notice: Subject to any disclaimer, the term of this patent is extended or adjusted under 35 U.S.C. 154(b) by 194 days.

(21) Appl. No.: 17/433,844

(22) PCT Filed: Feb. 24, 2020

(86) PCT No.: PCT/EP2020/054709
§ 371 (c)(1),
(2) Date: Aug. 25, 2021

(87) PCT Pub. No.: WO2020/182447
PCT Pub. Date: Sep. 17, 2020

(65) Prior Publication Data
US 2022/0137702 A1 May 5, 2022

(30) Foreign Application Priority Data
Mar. 11, 2019 (EP) .................................... 19161913

(51) Int. Cl.
| | | |
|---|---|---|
| *G06F 3/01* | (2006.01) | |
| *G06N 3/08* | (2023.01) | |
| *G06V 10/82* | (2022.01) | |
| *G06V 40/16* | (2022.01) | |
| *H04R 1/10* | (2006.01) | |

(52) U.S. Cl.
CPC .............. *G06F 3/011* (2013.01); *G06F 3/012* (2013.01); *G06N 3/08* (2013.01); *G06V 10/82* (2022.01); *G06V 40/176* (2022.01); *H04R 1/1016* (2013.01); *H04R 1/1041* (2013.01)

(58) Field of Classification Search
CPC ......... G06F 3/011; G06F 3/012; G06V 10/82; G06V 40/176; G06N 3/08; H04R 1/1016; H04R 1/1041
See application file for complete search history.

(56) References Cited

U.S. PATENT DOCUMENTS

| | | | |
|---|---|---|---|
| 8,223,024 B1 * | 7/2012 | Petrou .................. | H04W 12/33 340/573.7 |
| 8,639,320 B2 | 1/2014 | Tomita et al. | |
| 10,311,645 B1 * | 6/2019 | Ravindran ............ | A61B 5/163 |

(Continued)

FOREIGN PATENT DOCUMENTS

| | | |
|---|---|---|
| CN | 104731342 A | 6/2015 |
| JP | 2016126500 A | 7/2016 |

OTHER PUBLICATIONS

Office Action received for corresponding Indian Patent Application No. 202147045267, dated Apr. 6, 2022, 7 Pages.

(Continued)

*Primary Examiner* — Stephen G Sherman
(74) *Attorney, Agent, or Firm* — McCarter & English, LLP

(57) ABSTRACT

An apparatus comprising means for: receiving information from at least one inertial measurement unit configured to be worn on a user's head; and causing, at least in part, determining facial expression information in dependence on at least the received information.

20 Claims, 7 Drawing Sheets

(56) References Cited

U.S. PATENT DOCUMENTS

| | | | |
|---|---|---|---|
| 2009/0190803 | A1 | 7/2009 | Naghina et al. |
| 2010/0189358 | A1 | 7/2010 | Kaneda et al. |
| 2011/0032378 | A1 | 2/2011 | Kaneda |
| 2012/0229248 | A1 | 9/2012 | Parshionikar et al. |
| 2013/0005443 | A1 | 1/2013 | Kosta et al. |
| 2014/0078049 | A1 | 3/2014 | Parshionikar |
| 2016/0313801 | A1 | 10/2016 | Wagner et al. |
| 2017/0160813 | A1 | 6/2017 | Divakaran et al. ............... 3/17 |
| 2018/0074584 | A1 | 3/2018 | Rudiger et al. |
| 2018/0107275 | A1 | 4/2018 | Chen et al. ...................... 3/15 |
| 2018/0242908 | A1* | 8/2018 | Sazonov ............. A61B 5/4542 |
| 2018/0277092 | A1 | 9/2018 | Carr et al. ......................... 13/6 |
| 2018/0277093 | A1 | 9/2018 | Carr et al. |
| 2018/0278922 | A1 | 9/2018 | Boesen |
| 2020/0281516 | A1* | 9/2020 | Guay ................... A61B 5/036 |

OTHER PUBLICATIONS

Office Action received for corresponding European Patent Application No. 19161913.9, dated Feb. 2, 2022, 5 Pages.

Mollahosseini et al., "Going deeper in facial expression recognition using deep neural networks", IEEE Winter Conference on Applications of Computer Vision (WACV), Mar. 7-10, 2016, 10 pages.

Song et al., "Deep learning for real-time robust facial expression recognition on a smartphone", IEEE International Conference on Consumer Electronics (ICCE), Jan. 10-13, 2014, pp. 564-567.

Gruebler et al., "Measurement of distal EMG signals using a wearable device for reading facial expressions", Annual International Conference of the IEEE Engineering in Medicine and Biology, Aug. 31-Sep. 4, 2010, pp. 4594-4597.

Scheirer et al., "Expression glasses: a wearable device for facial expression recognition", Extended Abstracts on Human Factors in Computing Systems, May 15, 1999, pp. 262-263.

Masai et al., "Facial expression recognition in daily life by embedded photo reflective sensors on smart eyewear", Proceedings of the 21st International Conference on Intelligent User Interfaces, Mar. 7, 2016, pp. 317-326.

Cuddy et al., "Preparatory power posing affects nonverbal presence and job interview performance", Journal of Applied Psychology, vol. 100, No. 4, 2015, pp. 1286-1295.

Mast, "On the importance of nonverbal communication in the physician-patient interaction", Patient Education and Counseling, vol. 67, No. 3, Aug. 2007, pp. 315-318.

Travaline et al., "Patient-physician communication: why and how", Journal of the American Osteopathic Association, vol. 105, No. 1, Jan. 2005, pp. 13-18.

Leigh et al., "An initial evaluation of industrial buyers' impressions of salespersons' nonverbal cues", Journal of Personal Selling and Sales Management, vol. 22, No. 1, 2002, pp. 41-53.

"EarFieldSensing: A Novel In-Ear Electric Field Sensing to Enrich Wearable Gesture Input through Facial Expressions", Proceedings of the 2017 CHI Conference on Human Factors in Computing Systems, May 2017, 12 pages.

Ando et al., CanalSense: Face related Movement Recognition System Based on Sensing Air Pressure in Ear Canals, Proceedings of the 30th Annual ACM Symposium on User Interface Software and Technology, Oct. 2017, 11 pages.

Kawsar et al., "Demo Abstract: Esense—Open Earable Platform for Human Sensing", Proceedings of the 2018 ACM International Joint Conference and 2018 International Symposium on Pervasive and Ubiquitous Computing and Wearable Computers, 2018, pp. 371-372.

Bedri et al., "EarBit: Using Wearable Sensors to Detect Eating Episodes in Unconstrained Environments", Proceedings of the ACM on Interactive, Mobile, Wearable and Ubiquitous Technologies, vol. 1, No. 3, Sep. 2017, pp. 37:2-37:20.

Min et al., "Exploring Audio and Kinetic Sensing on Earable Devices", Proceedings of the 4th ACM Workshop on Wearable Systems and Applications, Jun. 2018, 6 pages.

Min et al., "Poster: Audio-Kinetic Model for Automatic Dietary Monitoring with Earable Devices", 16th ACM International Conference on Mobile Systems, Applications, and Services, MobiSys, Jun. 2018, 1 page.

Extended European Search Report received for corresponding European Patent Application No. 19161913.9, dated Aug. 26, 2019, 8 pages.

International Search Report and Written Opinion received for corresponding Patent Cooperation Treaty Application No. PCT/EP2020/054709, dated Apr. 28, 2020, 11 pages.

Kawsar Fahim et al., "Earables for Personal-Scale Behavior Analytics", IEEE Pervasive Computing, vol. 17, No. 3, Jul. 2018, pp. 83-89.

Jing, Chen, "Shakespeare's the Tempest Comes Realistically", IT Manager World, Issue 5, pp. 64-67, Mar. 5, 2017.

Lee, Seungchul, et al., "Automatic Smile and Frown Recognition with Kinetic Earables", Proceedings of the 10$^{th}$ Augmented Human International Conference 2019, Mar. 11-12, 2019, 4 pages.

ISBN 978-7-81118-566-9, Mar. 31, 2010, 4pages.

ISBN 978-7-5682-4877-8, Sep. 30, 2017, 5 pages.

"Computational Intelligence-based Electricity Load Forecasting: Theory and Applications", Wuhan University Press, ISBN 978-7-307-20613-7, Jan. 31, 2019, 4 pages.

* cited by examiner

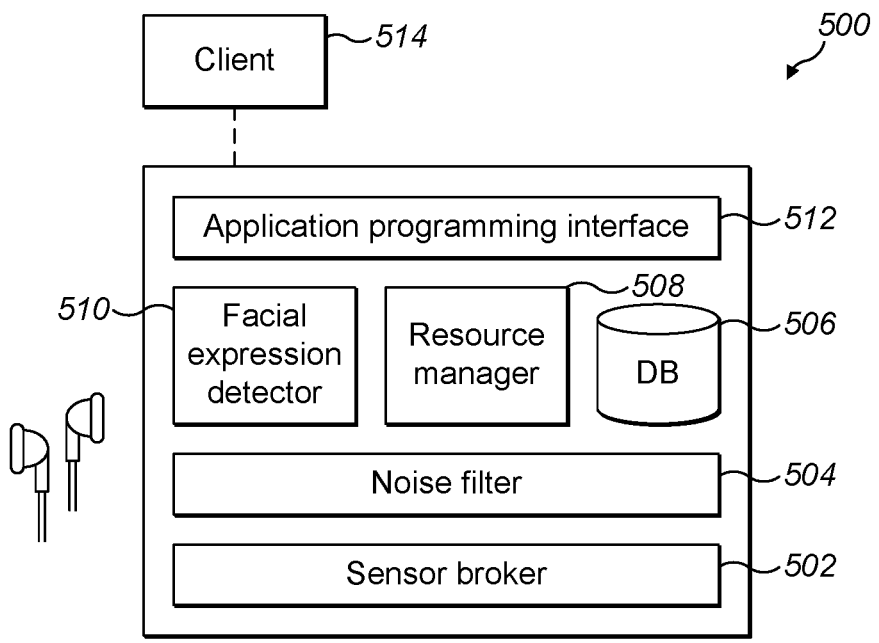
FIG. 6
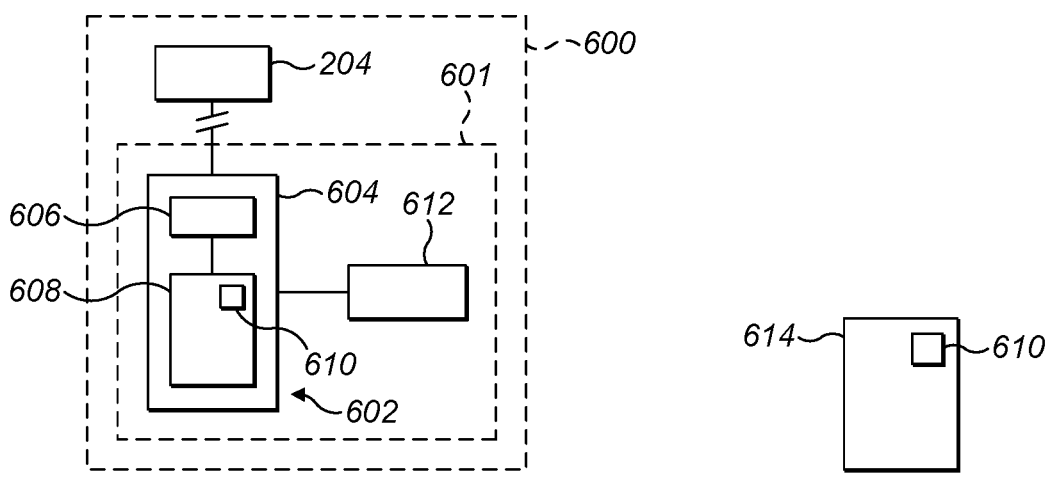
FIG. 7A
FIG. 7B

DETECTION OF FACIAL EXPRESSIONS

RELATED APPLICATION

This application claims priority to PCT Application No. PCT/EP2020/054709 filed on Feb. 24, 2020, which claims priority to EP Application No. EP19161913.9, filed on Mar. 11, 2019, the contents of which are incorporated herein by reference in their entirety.

TECHNOLOGICAL FIELD

Embodiments of the present disclosure relate to detection of facial expressions. Some relate to detection of facial expressions using information from at least one wearable inertial measurement unit.

BACKGROUND

Facial expressions provide powerful and essential non-verbal signals for social interactions. Facial expressions convey cues about human emotion, empathy and affect. Systems which can accurately detect facial expressions opens up a new market for useful products and services.

It is difficult to design such systems to allow high freedom of movement of the head, to allow changing ambient conditions, and to ensure that the system is unobtrusive if it is portable.

BRIEF SUMMARY

According to various, but not necessarily all, embodiments there is provided an apparatus comprising means for: receiving information from at least one inertial measurement unit configured to be worn on a user's head; and causing, at least in part, determining facial expression information in dependence on at least the received information.

In some, but not necessarily all examples, the at least one inertial measurement unit comprises a gyroscope.

In some, but not necessarily all examples, the inertial measurement unit is configured as part of an earable.

In some, but not necessarily all examples, the facial expression information is determined in dependence on the information and on machine learning.

In some, but not necessarily all examples, the machine learning comprises a machine learning algorithm comprising a neural network or a hidden Markov model.

In some, but not necessarily all examples, the machine learning algorithm comprises one or more convolution layers and one or more long short term memory layers.

In some, but not necessarily all examples, the apparatus comprises means for causing, at least in part, controlling an electronic device function in dependence on the facial expression information.

In some, but not necessarily all examples, the controlling an electronic device function comprises controlling output of feedback information in dependence on the facial expression information, by an output device.

In some, but not necessarily all examples, the feedback information comprises a recommended change of task.

In some, but not necessarily all examples, the feedback information comprises a recommended change in how a task is performed.

In some, but not necessarily all examples, the controlling an electronic device function comprises interpreting the facial expression information as an input command by the user, and causing the electronic device function to be controlled in dependence on the input command.

According to various, but not necessarily all, embodiments there is provided a hand-portable electronic device comprising the apparatus.

According to various, but not necessarily all, embodiments there is provided a system comprising the apparatus and the inertial measurement unit.

According to various, but not necessarily all, embodiments there is provided a method comprising: receiving information from at least one inertial measurement unit configured to be worn on a user's head; and causing, at least in part, determining facial expression information in dependence on at least the received information.

According to various, but not necessarily all, embodiments there is provided a computer program that, when run on a computer, performs: causing receiving information from at least one inertial measurement unit configured to be worn on a user's head; and causing, at least in part, determining facial expression information in dependence on at least the received information.

According to various, but not necessarily all, embodiments there is provided examples as claimed in the appended claims.

BRIEF DESCRIPTION

Some example embodiments will now be described with reference to the accompanying drawings in which:

FIG. 6 illustrates an example of a facial expression information server;

FIG. 7A illustrates an example of an apparatus, a device and a system, and FIG. 7B illustrates an example of a computer readable storage medium.

DETAILED DESCRIPTION

Figure 1:
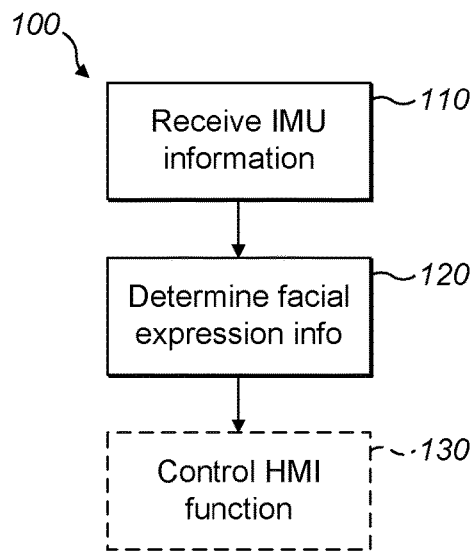
FIG. 1 illustrates an example of a method.
Figure 2A:
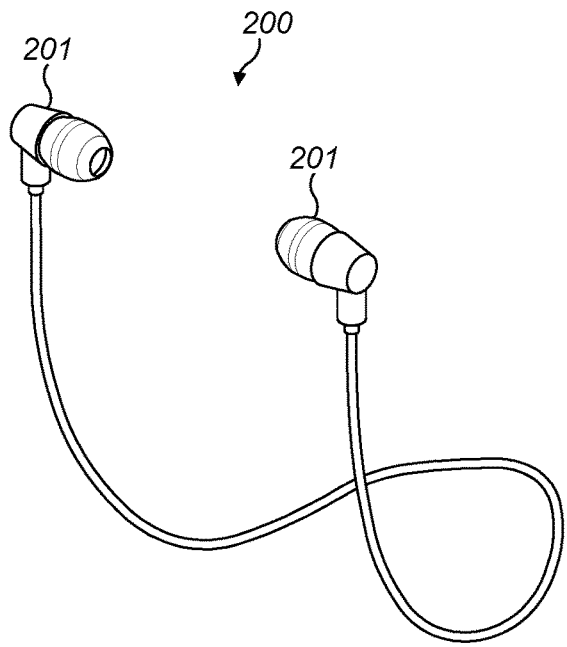
FIG. 2A illustrates an example of an earable and FIG. 2B illustrates an example of components of the earable.
Figure 2B:
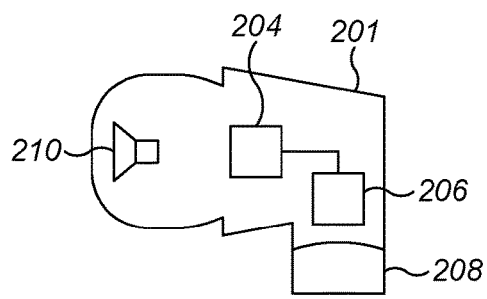

FIG. 1 illustrates an example of a method 100 comprising: at block 110, receiving information from at least one inertial measurement unit (IMU) such as the IMU 204 shown in FIG. 2B configured to be worn on a user's head; and at block 120, causing, at least in part, determining facial expression information in dependence on at least the received information. Optional block 130 comprises causing, at least in part, controlling a human-machine interface function in dependence on the facial expression information.

Measurements from IMUs 204 can be correlated with facial expressions, as described herein. IMUs 204 are small and inexpensive. IMUs 204 can also be discreet because the sensor does not need to be in continuous contact with the user's skin in order to measure the inertial effect of moving a facial muscle on the surface of the skin. For the same reason, no implant or other intrusive procedure is necessary to install an IMU 204.

Firstly, various example implementations of block 110 will be described in detail. In order to receive useful IMU information, the IMU 204 is first worn.

The IMU 204 is worn at a location on a user's head. For the purposes of this disclosure, the location is any location on the human head that moves in a manner detectable by an IMU 204 in dependence on contraction and/or relaxation of a facial muscle. Such locations include locations on the head and may also include locations in an upper region of the neck which are otherwise anatomically classed as part of the neck.

In some, but not necessarily all examples, more than one IMU 204 is worn. Wearing multiple IMUs 204 may comprise wearing more than one IMU 204 at a first location. Wearing multiple IMUs 204 may comprise wearing IMUs 204 that provide different sensing modalities. For example, different sensing modalities may comprise a gyroscope and an accelerometer. Wearing multiple IMUs 204 may comprise wearing one IMU 204 per-axis for up to three axes of measurement. Therefore, three accelerometer IMUs can be configured to provide the functionality of a three-axis accelerometer, and three gyroscope IMUs can be configured to provide the functionality of a three-axis gyroscope.

Wearing multiple IMU's may comprise wearing IMUs 204 at different locations on the user's head. In some examples, the different locations may be to the left and right sides of the head. The locations may be on symmetrically opposed sides of the head. This provides better discrimination between symmetrical and asymmetrical facial expressions (e.g. smile vs half smile). In other examples, the distribution of locations may be to target different facial muscles and may or may not involve symmetrical IMU positioning.

Example attributes of a wearable device for positioning the IMU(s) 204 at the required location(s) are described below.

A wearable device comprising the IMU 204 may be configured to be worn in a re-usable manner. A re-usable manner means that the wearable device can be removed and later re-worn without irrevocable damage upon removal. The wearable device may be wearable on an outside of the user's body, such that no implant is required.

The IMU 204 may be provided on or embedded in the wearable device. The IMU 204 may be positioned with respect to the wearable device so as not to contact or not to continuously contact the user's skin when worn in use, to improve comfort.

The wearable device may provide a wearable accessory function. An accessory as described herein means a wearable device that provides at least an aesthetic and/or non-medical function. Examples of wearable accessories include earables (or hearables), virtual reality headsets, spectacles, clothing, jewellery and hair accessories. An earable is a wearable accessory that can be worn in or on the ear. A hearable is defined herein as an earable with an audio speaker.

Examples of further functions of a wearable accessory include, but are not limited to providing a human-machine interface (input and/or output), noise cancellation, positioning additional sensors for other uses etc. Some wearable accessories may even comprise additional medical/non-accessory functions e.g. corrective/tinted spectacle lenses, positioning health-monitoring sensors.

The wearable device may be configured not to be single-use. For example, the wearable device may be configured for a friction and/or bias fit. This obviates the need for single-use adhesives, etc. However, in an alternative implementation, the wearable device is configured for single-use operation, for example the wearable device may comprise an adhesive patch.

FIG. 2A and FIG. 2B illustrate an example implementation of a wearable device 200 comprising earables 201. An advantage of earables 201 is convenience, compared to wearing specific clothing or unnecessary spectacles for example. Another advantage is that the earables 201 are positioned close to several facial muscles that are strongly correlated with common facial expressions, and that earables 201 can provide additional functions such as a headphone function or positioning other sensors. The correlations are discussed later.

FIG. 2A shows two earables 201, for use with left and right ears respectively. In other examples, just one earable 201 is provided for use with one ear only.

An internal view of an earable 201 of FIG. 2A is shown in FIG. 2B. The earable 201 comprises a human-machine interface comprising at least an audio speaker 210 for audio output, so that the function of a hearable device is provided. The illustrated earable 201 comprises at least one IMU 204. In an example implementation, the earable 201 comprises a three-axis gyroscope and a three-axis accelerometer.

The illustrated earable 201 (or other wearable device) comprises circuitry 206 for enabling the IMU(s) 204 to function. The circuitry 206 may enable the audio speaker 210 to function. The circuitry 206 may be powered by an electrical power source (not shown). An interface such as a wire or antenna (not shown) may provide a communication link between at least the IMU 204 and external apparatus, if required.

The earable 201 of FIG. 2A and FIG. 2B is an in-ear earable 201 for embedding in the auricle. The in-ear earable 201 may be configured for embedding proximal to the ear canal. The in-ear earable 201 may be configured for embedding in the concha or concha cavum. An advantage is that a strong correlation exists between movement of facial muscles forming common facial expressions, and deformation or movement of the part of the ear in contact with the earable 201. This correlated movement can be leveraged by positioning the IMU 204 within the earable 201 for the IMU output to depend on the movement or deformation of the ear. Therefore, an earable 201, for example an in-ear earable 201, reduces the amount of data processing required for isolating meaningful signals from signal noise, compared to other wearable devices. Other wearable devices can work when positioned at various head locations specified herein, and form part of the present disclosure. However, earables 201 provide an advantageous compromise between correlation (required data processing) and obtrusiveness to the wearer 400 (the user who is wearing the IMU 204).

The earable 201 may be configured to maintain a predetermined orientation of the IMU 204 with respect to the user, to ensure clean data is obtained. In the example of FIG. 2A and FIG. 2B, the earable 201 comprises an element 208 configured to engage with the intertragic notch of the user's ear. The element 208 may comprise a sleeve for a wire, configured to increase the effective stiffness of the wire and reduce bending fatigue. If the earable 201 is wireless, the element 208 could comprise an internal antenna for wireless communication. In other examples, the element 208 could serve no other purpose than to engage with the intertragic notch to position the earable 201 in a predetermined orientation.

It would be appreciated that the earable 201 of FIG. 2A is one of many possible alternative wearable devices that could comprise the IMU 204.

As stated above, the information which is provided by the IMU 204 is received as block 110 of the method 100. The information may be received at an apparatus which is part of a same wearable device that comprises the IMU 204, or at an apparatus remote from the IMU 204 via a communication link. The information may be received in raw form directly from the sensors, as analog signals. Alternatively, the information may be received in digital form and/or may have been pre-processed, e.g. to filter out noise.

Once the information from the IMU 204 has been received, block 110 is complete and the method 100 progresses to block 120. At block 120, the method 100 comprises causing, at least in part, determining facial expression information in dependence on at least the received information. The facial expression information is determined by processing the received IMU information, and optionally additional information.

The determination of facial expression information could be made locally at the circuitry 206 using locally available processing resources, or caused to be happened remotely, e.g. at a remote server with improved processing resources.

The determined facial expression information indicates which of a plurality of different facial expressions is indicated by the received information. Determining the facial expression information may therefore comprise determining which one of the plurality of different facial expressions is indicated by the received information. The one facial expression which is selected defines the facial expression information. The plurality of different facial expressions may correspond to particular user-defined or machine-defined labels or classes.

The determined facial expression information may discriminate between different upper face expressions and/or discriminate between different lower face expressions, based on the received IMU information. The upper face expressions may be associated with at least eyebrows and/or eyes. Lower face expressions may be associated with at least the mouth. The plurality of different facial expressions may indicate different upper face expressions and/or different lower face expressions. In some examples, changes in upper face expression and changes in lower face expression are both capable of changing the determined facial expression information. This improves the accuracy of emotion capture. In a non-limiting example, different facial expression information may be determined for a smile with symmetrical eyebrows compared to a smile with a raised eyebrow.

Figure 3:
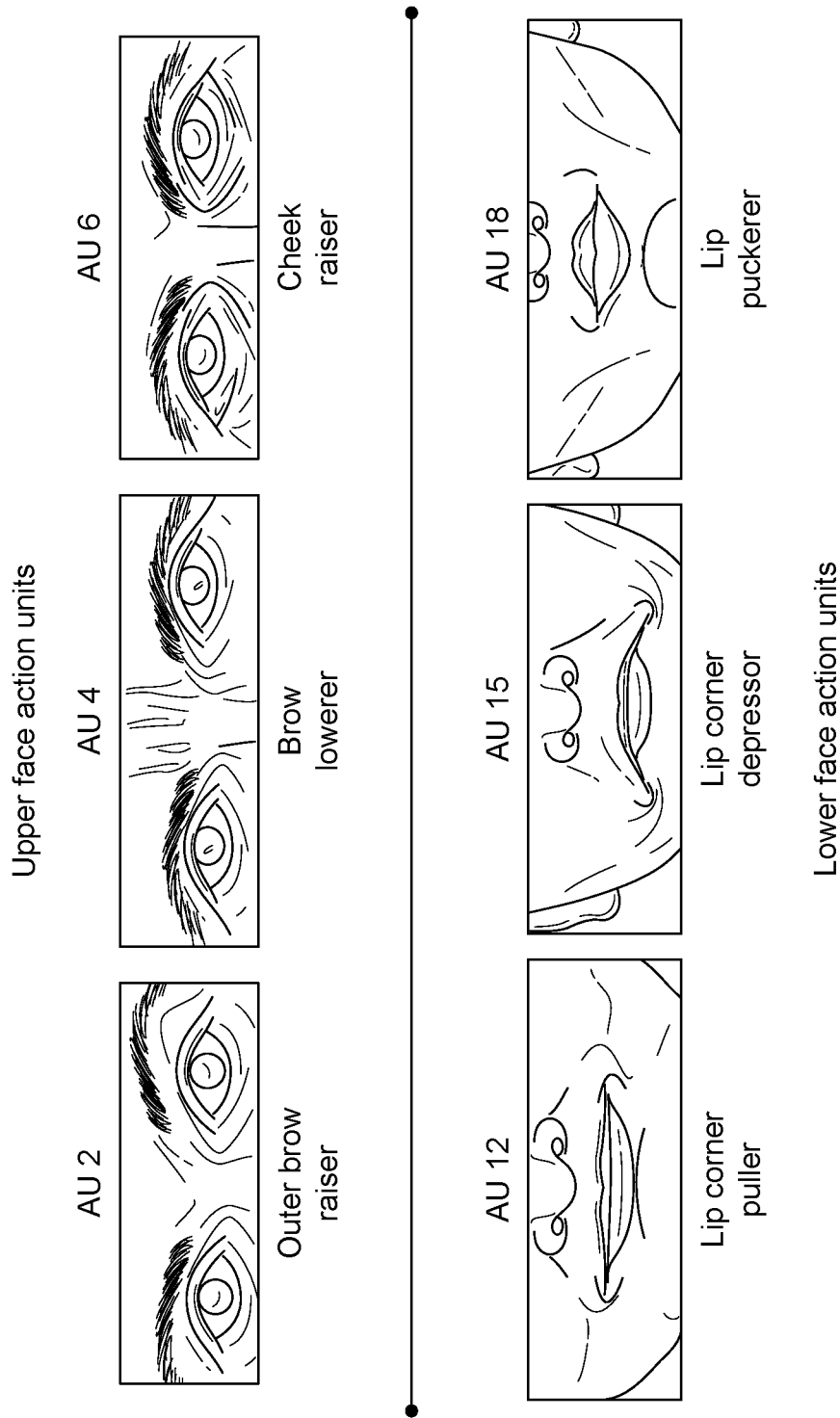
FIG. 3 illustrates facial expressions demonstrating six Action Units.

Experiments on facial expressions are described below with reference to 'Action Unit' (AU) codes as specified by the Facial Action Coding System (FACS) developed by P. Ekman and W. Friesen (Facial Action Coding System: A Technique for the Measurement of Facial Movement. Consulting Psychologists Press, Palo Alto, 1978). FIG. 3 shows facial expressions corresponding to AU2 (outer brow raiser), AU4 (brow lowerer), AU6 (cheek raiser), AU12 (lip corner puller), AU15 (lip corner depressor) and AU18 (lip puckerer).

Figure 4:
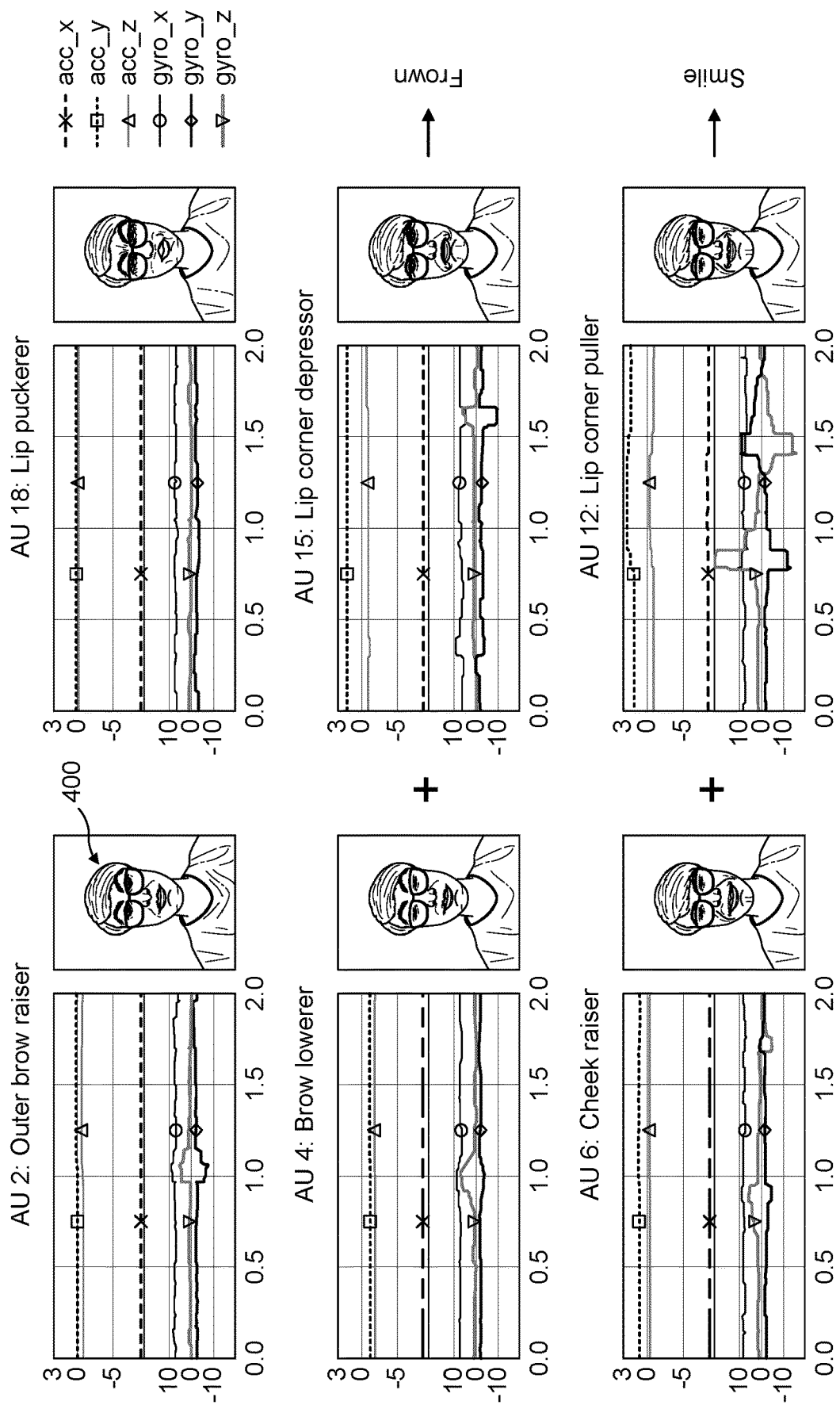
FIG. 4 illustrates time histories of inertial measurement unit data for the six Action Units.

FIG. 4 illustrates a time-history of IMU data for the in-ear earable 201 of FIG. 2, collected as a wearer 400 adopts each of the six action units illustrated in FIG. 3. The wearer 400 performed no other facial activities such as talking or eating, while adopting the AUs. The plotted IMU data comprises three-axis accelerometer data and three-axis gyroscope data.

The results of FIG. 4 show that correlations exist between the IMU data and the AUs. Some correlations are stronger than others. In the study of FIG. 4, but not necessarily for all facial expressions or wearable devices, stronger correlations can be found in the data from the gyroscope compared to the accelerometer. Stronger correlations can be found in the x-axis and y-axis data from the gyroscope, compared to the z-axis data from the gyroscope. In this example, the x-axis is approximately in the anterior direction, the y-axis is approximately in the superior direction and the z-axis is approximately in the lateral direction.

Notably, the shapes of the time histories of FIG. 4 differ between AUs, enabling the discrimination of different AUs. This shows that it is possible at block 120 to determine which one of a plurality of facial expressions is indicated by the received information from at least one IMU 204. Just one IMU 204 can be provided, although employing multiple IMUs 204 as shown improves accuracy.

As illustrated, the gyroscope provided clear signals for brow movements, cheek movements and lip corner movements. The accelerometer picked up clear signals for lip corner movements.

An in-ear earable IMU 204 can provide clear signals for both upper face AUs and lower face AUs. Table 1 shows AUs for which the clearest signals were found:

TABLE 1

AUs for which clear signals were found by the earable IMU 204, and their muscular basis.

| AU number | FACS name | Muscular basis |
|---|---|---|
| 1 | Inner brow raiser | Frontalis |
| 2 | Outer brow raiser | Frontalis |
| 4 | Brow lowerer | Depressor glabellae, depressor supercilii, corrugator supercilii |
| 6 | Cheek raiser | Orbicularis oculi |
| 9 | Nose wrinkle | Levator labii superioris, alaeque nasi |
| 12 | Lip corner puller | Zygomaticus major |
| 13 | Sharp lip puller/ cheek puffer | Levator anguli oris |
| 15 | Lip corner depressor | Depressor anguli oris |
| 16 | Lower lip depressor | Depressor labii inferioris |
| 26 | Jaw drop | Masseter, relaxed temporalis and internal pterygoid |
| 27 | Mouth stretch | Pterygoids, digastric |

The above list of AUs that can be detected via the earable IMU 204 is not exhaustive, and would be best expressed as including any AUs that involve the above-listed facial muscles of Table 1 alone or in combinations. Facial expressions with higher impulse responses can be detected more easily than facial expressions that are slower. Additional AUs and muscle dependencies could be detected with more sensitive IMUs 204 and/or improved data processing methods. The IMU 204 used for the experiment of FIG. 4 was an inexpensive MPU6500 model.

The manner in which the facial expression information can be identified is described.

It is possible to accurately determine the facial expression information without machine learning. In a simple implementation, predetermined threshold values can be defined for instant values and/or time-derivatives of data from one or more IMUs 204. When a defined threshold(s) is exceeded, a determination is made of which one of a plurality of facial expressions is indicated by the received information.

In various, but not necessarily all examples of the disclosure, the determination of block 120 is dependent on both the information and on machine learning. Machine learning can improve reliability. Various machine learning algorithms for determining facial expression information are described.

The machine learning algorithm may be a supervised machine learning algorithm. The supervised machine learning algorithm may perform classification to determine which predetermined class of facial expressions is indicated by the information. This enables class labels to be pre-defined using terms of facial expression such as 'smile', 'frown', etc, to improve user recognition.

The class labels do not necessarily correspond to individual AUs, but may correspond to classes of facial expression which are best-described as combinations of AUs. For example, a smile comprises a combination of AU6 and AU12. A combination of AU4 and AU15 represents a frown. The algorithm may use at least the following class labels: smile; frown; none.

The machine learning algorithm may alternatively be an unsupervised machine learning algorithm. An unsupervised machine learning algorithm may perform clustering without class labels or training. This obviates the training burden which could otherwise be significant for accounting for the population variation of facial geometry and IMU wearing-positions (e.g. different orientations in different user's ears).

The machine learning algorithm may comprise a convolutional neural network (CNN) and/or a recurrent neural network (RNN) and/or a temporal convolutional network. A hidden Markov model (HMM) could be used instead for lower latency, although CNNs and RNNs can attain greater accuracy than HMM with sufficient training. In an example implementation, the machine learning algorithm comprises one or more convolution layers, one or more long short term memory (LSTM) layers, and an attention mechanism, for an accuracy improvement over basic CNNs while having sufficiently low processing requirements to enable on-the-fly facial expression information tracking. In further alternative examples, the machine learning algorithm may comprise a deep neural network (DNN) for the greatest accuracy, at the expense of greater processing requirements.

Example supervised machine learning algorithms that were experimented on are described below, and their F1 scores are provided to rank their performance relative to each other. The performance was assessed based on the ability to detect three facial expressions: smile (AU6+AU12); frown (AU4+AU15); and none. The experiment comprised nine participants performing the above facial expressions and was repeated 20 times per participant. The equipment was as described above for FIG. 4.

Figure 5A:
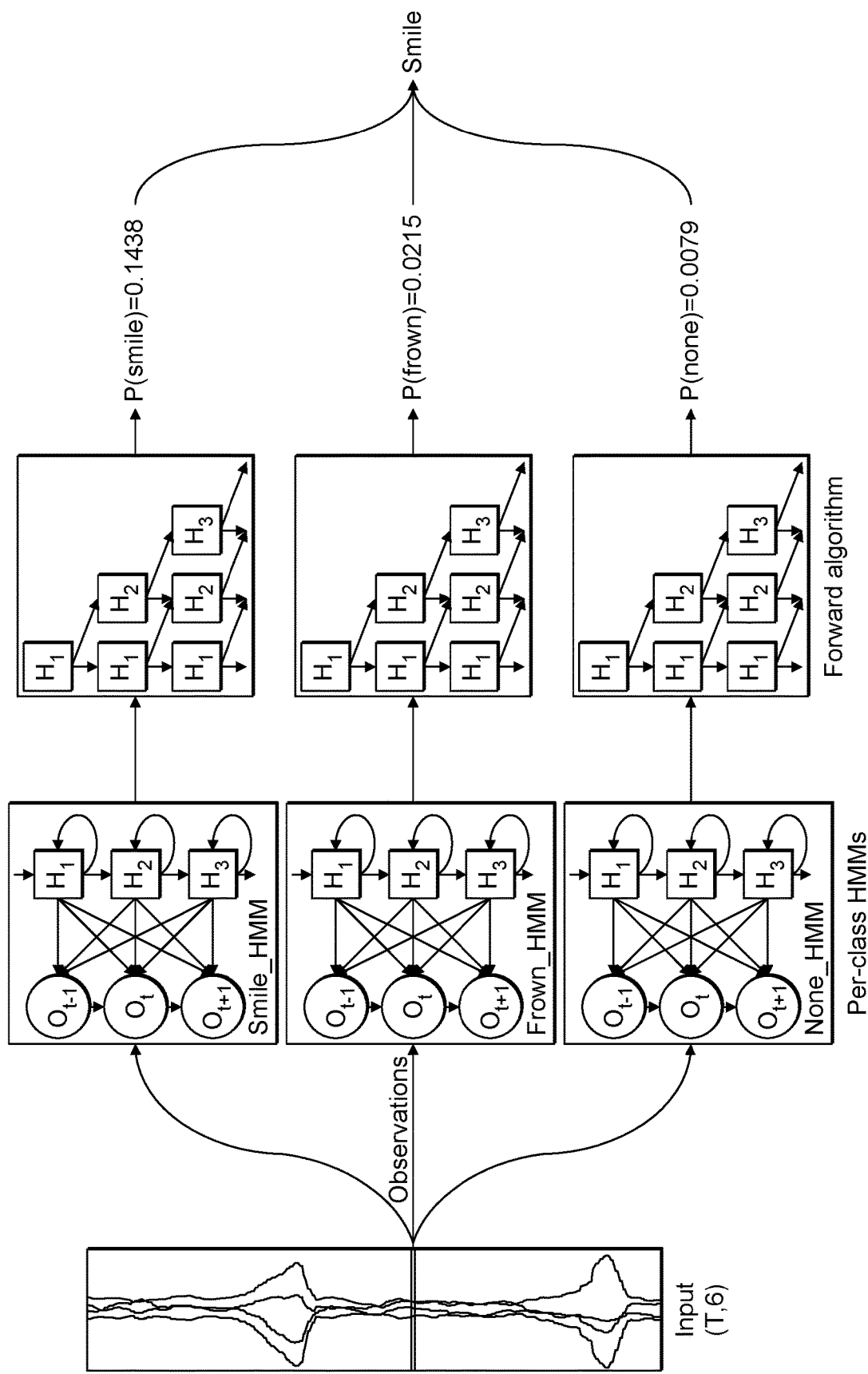
FIG. 5A illustrates an example of a hidden Markov model algorithm.

FIG. 5A shows an example structure of an HMM-based learning scheme for an experiment. HMM has low latency, is effective to characterize sequential data with an embedded structure (=AUs), and is robust to variable input size.

The HMM pipeline extracted a list of 8-dimensional vectors (3-axis acceleration, 3-axis gyro signals, acceleration magnitude and gyro magnitude) for a period of time during which the wearer 400 adopts the facial expressions. The HMM algorithm was trained using the Baum-Welch algorithm. The HMM was configured using a 12-hidden-state left-right model with Gaussian emissions. The log likelihood of an observed sequence for each class was determined using the forward algorithm. The model of facial expression with the maximum log likelihood was selected as the final result, to represent the facial expression information of block 120.

From the HMM experiment, the average F1 score was 0.88, which implies that HMM classifiers are able to capture intermittent and microscopic muscle movements during facial expressions. For example, a smile was detected correctly most times (F1 score=0.96). The F1 score for frowning was 0.89. The F1 score for no expression was 0.79.

Figure 5B:
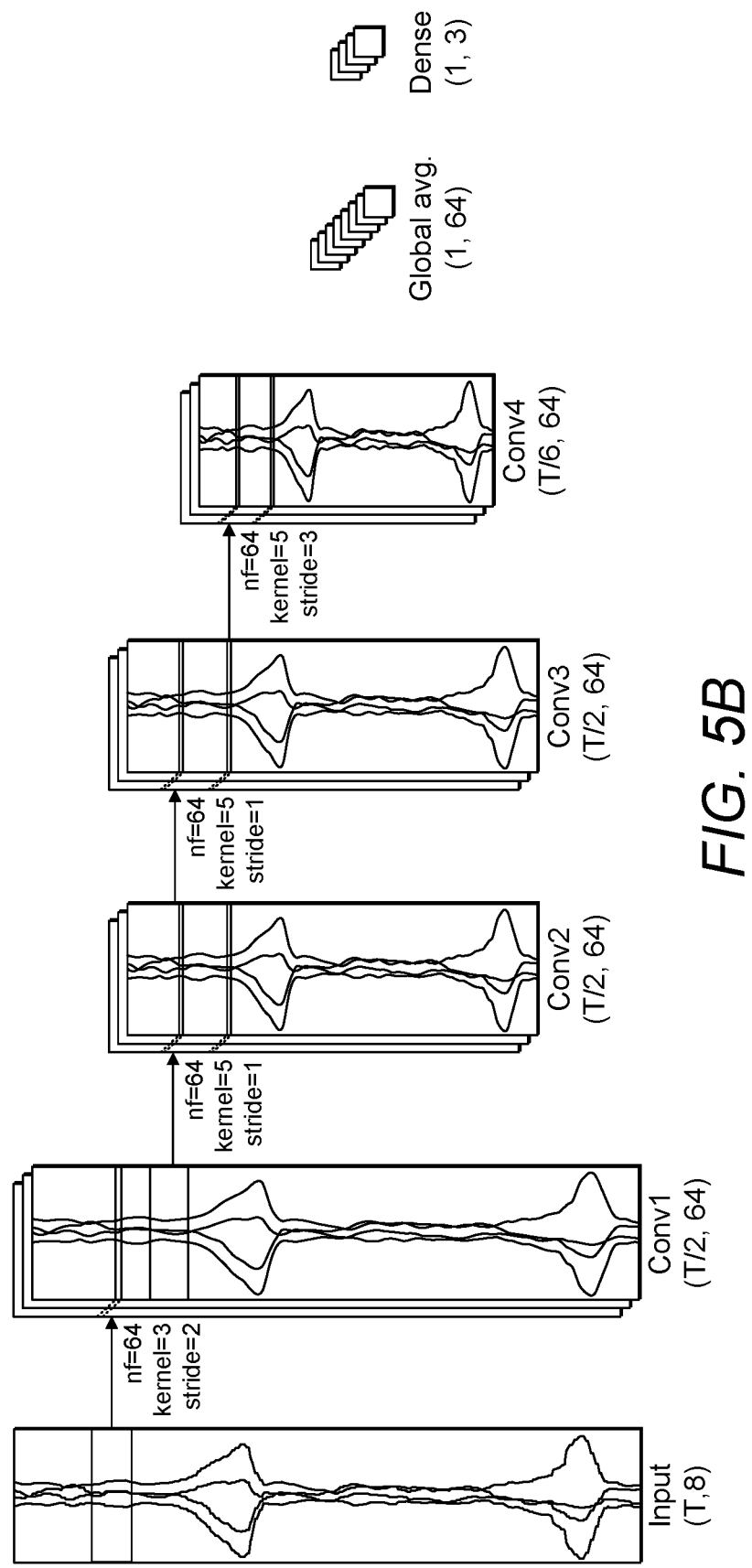
FIG. 5B illustrates an example of a convolutional neural network algorithm.

FIG. 5B shows an example structure of a CNN-based learning scheme for the same experimental data as FIG. 5A.

The CNN comprises a chain of four temporal convolution layers 'Conv1', 'Conv2', 'Conv3', 'Conv4', and a pooling layer prior to a top-level fully-connected layer and softmax group. Each convolution layer comprises 64 filters (nf=64). 'Conv1' comprises 3 kernels (kernel=3). The other convolution layers comprise 5 kernels each. 'Conv1' has a stride of 2, 'Conv2' and 'Conv3' have a stride of 1, and 'Conv4' has a stride of 3. The 'Global avg.' layer has a data size of (1,64) and the 'Dense' layer has a data size of (1,3). T is the window size.

The average F1 score of the CNN of FIG. 5B is 0.54, which is significantly above random chance and can be improved beyond the capabilities of HMMs by further training. It would be appreciated that in use, the values of nf, kernel, stride, T, the data size, the number of layers, and any other configurable properties of a CNN may differ based on implementation.

Figure 5C:
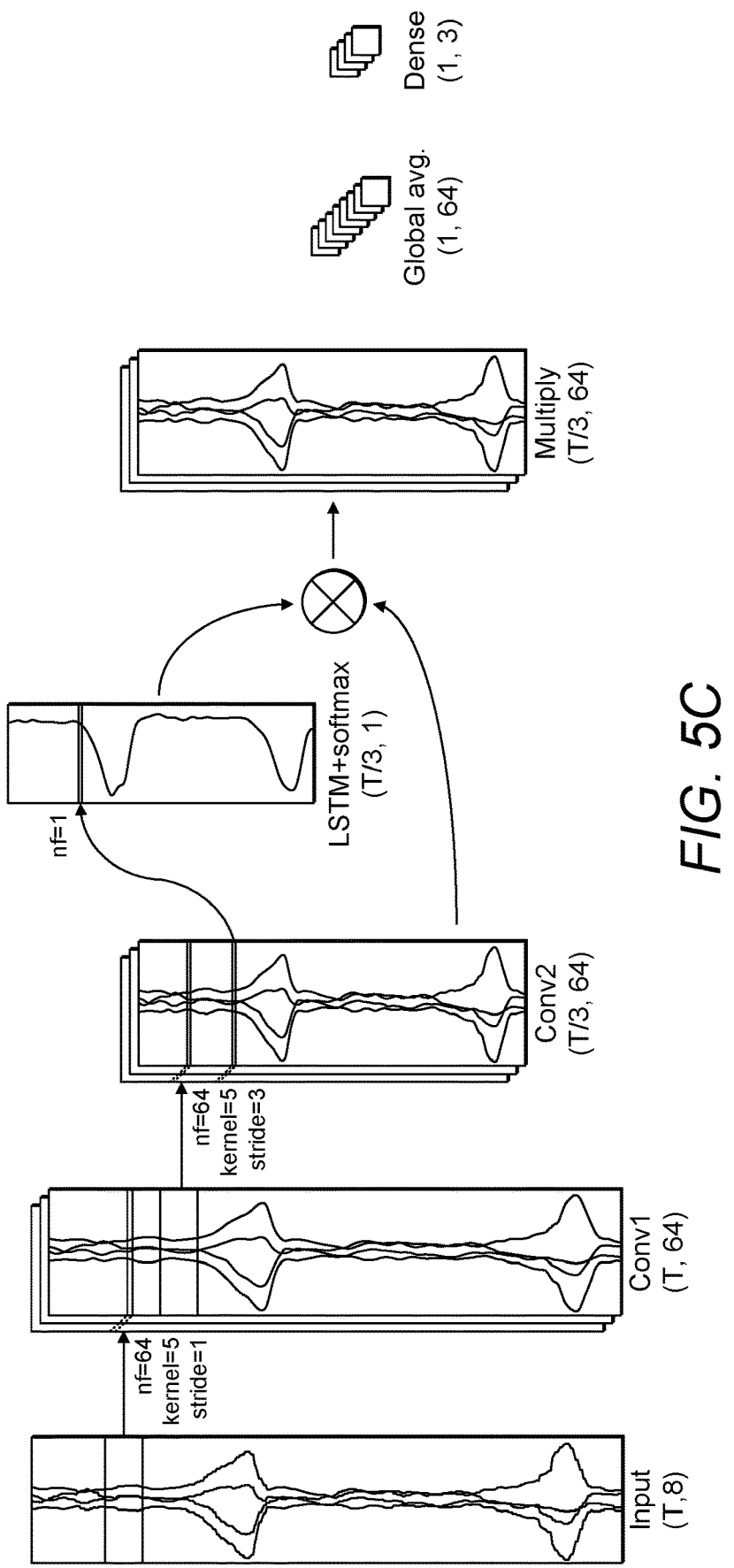
FIG. 5C illustrates an example of an improved convolutional neural network algorithm.

FIG. 5C shows an example structure of an improved CNN-based learning scheme, herein referred to as 'ConvAttention'. A key feature of ConvAttention is to adopt LSTM (a special type of RNN) and an Attention mechanism in order to better highlight the kinetic features of IMU signals made by the facial expressions. LSTM was used to leverage the temporal pattern of AUs as LSTM is designed to exploit the temporal dependencies within the data. The attention mechanism was adopted as it lets recurrent networks reduce false positives from noise, by targeting regions of interest in the data where the facial expression change actually takes place, and giving higher weights to regions of interest. FIG. 5C shows two convolution layers Conv1 (nf=64, kernel=5, stride=1) and Conv2 (nf=64, kernel=5, stride=3) followed by the LSTM layer that returns attention weights for each time point. The probabilities are multiplied with the feature vectors from the convolution layers, and averaged to result in a single feature vector. The feature vector is then non-linearly converted into class likelihood through a fully-connected layer.

The average F1 score of ConvAttention is 0.79 which is significantly above random chance and can be improved beyond the capabilities of HMMs by further training. It would be appreciated that configurable properties may differ based on implementation.

Once the facial expression information has been determined, block 120 is complete. The facial expression information is then available to be used for various purposes.

FIG. 6 shows a potential architecture for a facial expression information server 500 that can provide facial expression information to a requesting client 514. The client 514 may be a client software application, for example. The server 500 may reside in software implemented in one or more controllers and/or may reside in hardware. The server 500 performs the method 100 of FIG. 1 for clients 514.

An example implementation of the server 500 is described below.

The server comprises a sensor broker 502 is configured to receive the information from the at least one IMU 204, and which performs block 110. In some, but not necessarily all examples, information from additional sensors of different modalities may be received by the sensor broker 502, for synthesis and use in block 120 of the method 100. Additional sensors (not shown) that can detect facial expressions include, but are not limited to:
    proximity sensors on spectacles;
    a force sensor on an earable 201;
    a bend sensor on an earable 201;
    a capacitance sensor proximal on a wire of an earable 201
        and an electromyography sensor on an earable 201.

A proximity sensor may be configured to detect the distance between the spectacles and a respective local position on the face. When muscles around the eyes and nose (e.g. orbicularis oculi, frontalis, levator labii superioris, nasalis) tense up (e.g. contempt, disgust, sadness), the face around the eyes and nose may bulge and therefore change the distance between the local positions on the face and the corresponding proximity sensors.

A force sensor may be configured to detect pressure on the force sensor by deformation of the ear. The deformation of the ear may be caused by tension of the auricularis superior and zygomaticus major, which relates to fear, anger and surprise.

A bend sensor may be configured to detect bend of a wire of the earable 201, if the earable 201 is wired (e.g. headphone cable hanging down from the ears). When the masseter, zygomaticus and buccinator muscles are in tension (happiness), the face bulges which pushes the wires and causes some bend. An example of a compact bend sensor for detecting the small bend of the wire is a nanosensor comprising a torsional optomechanical resonator and a waveguide such as fiber optic cable, for detection of torsion (bending).

A capacitance sensor may be configured to detect a change in capacitance at a wire of the earable 201. The capacitance sensor may be provided in the wires. When the head moves or expression changes, the face may touch a wire, causing a change of capacitance of the wire at a location along the wire. Happiness (smiling) can be detected using a capacitance sensor.

The sensor broker 502 is configured to provide the received information to an optional noise filter 504. The noise filter 504 may comprise a high-pass filter, low-pass filter band-pass filter, an independent component analysis filter, or a spatio-temporal filter such as a discrete wavelet transform filter. In an example implementation, the noise filter 504 comprises a low-pass filter.

The filtered information is then passed to a facial expression detector 510, which can perform block 120.

An optional resource manager 508 adjusts the sampling rate and monitoring interval of the IMU 204, for example in dependence on resource availability and/or a client application's request.

An optional application programming interface (API) 512 is provided which enables clients 514 such as software applications or other requestors to request facial expression information.

In some, but not necessarily all examples, the API 512 could support a plurality of request types, such as 1) continuous queries, 2) on-spot queries, and/or 3) history queries. A continuous query may cause the server 500 to continuously or periodically monitor a user's facial expression and provide the final results at a given time. An on-spot query may cause the server 500 to return the latest facial expression the user made. A history query may cause the server 500 to return a list of past facial expressions within a request-specified time range.

An optional database 506 maintains facial expression information and/or raw IMU data, for example to respond to history queries.

The method 100 may terminate or loop back upon completion of block 120. After block 120 the determined facial expression information may be stored in a memory. For a client-server model as described above, the determined facial expression information may be stored in a database 506 and/or provided to a requesting client 514. Therefore, in the client-server model the method 100 may comprise receiving a request for facial expression information from a client 514. The request may indicate one of the above request types. The method 100 may comprise providing the facial expression information in response. The provided information may comply with the request type.

Once the client 514 has received the facial expression information, the client may then control an electronic device function in dependence on the facial expression information. Therefore, the server 500 or other apparatus performing the method 100 can be summarized as being able to cause, at least in part (e.g. via a client), controlling an electronic device function in dependence on the facial expression information. Therefore, an optional block 130 of the method 100 is provided which comprises causing, at least in part, controlling an electronic device function in dependence on the facial expression information.

Some example use cases are provided below for how applications may control an electronic device function in dependence on the facial expression information. The example use cases represent situations in which users may desire to, or at least accept, putting on a wearable device comprising the IMU 204. They also represent situations when it may be undesirable or impractical to ensure that the wearer 400 is in a field of view of a camera for tracking facial expressions.

In some, but not necessarily all examples, the controlling an electronic device function comprises controlling an actuator. Examples of actuators that can be controlled include, but are not limited to: environmental control actuators (e.g. thermostat); navigation actuators (e.g. CCTV pan/zoom, steering); or medical device actuators.

In some, but not necessarily all examples, the controlling an electronic device function comprises controlling a human-machine interface (HMI) function. The controlling a human-machine interface function may comprise interpreting the facial expression information as an input command by the user, and causing the electronic device function to be controlled in dependence on the input command. This enables the user to deliberately modify their facial expression to provide user inputs to control the electronic device. Additionally or alternatively, the controlling a human-machine interface function may comprise controlling output of feedback information in dependence on the facial expression information, by an output device. This enables information dependent on the wearer's facial expression to be fed back to the wearer user or a different user.

In examples where at least one output function is controlled, the output function may be a user output function provided by one or more of the following output devices for user output: a display; a printer; a haptic feedback unit; an audio speaker (e.g. 210); or a smell synthesizer.

In examples in which the output device is a display, information displayed by the display in dependence on facial expression information may comprise text, imagery or any other appropriate graphical content. The displayed information may indicate to a user of a client application 514 current facial expression information or current emotional state information associated with the wearer. The user of the client application 514 could be the monitored user (IMU wearer 400) or another user.

Displayed facial expression information as mentioned above may simply provide an indication of a facial expression (e.g. smiling, frowning). Displayed emotional state information as described above may provide an indication of an emotion determined to be associated with the facial expression (e.g. smiling=happy, frowning=sad/confused).

Additional processing may be performed to determine emotional state information from facial expression information. This is because an emotional state is not necessarily indicated by an instant facial expression, but could be apparent from a temporal history of facial expressions. Emotional state information indicating fatigue could be correlated with frequent expressions within classes associated with negative emotions (e.g. anger, disgust, contempt). Therefore, the emotional state information may be determined in dependence on a temporal history of facial expression information.

In examples where at least one output function is controlled, the control of block 130 may comprise controlling output of feedback information in dependence on the facial expression information, by an output device. The feedback information may indicate the current emotional state of the wearer 400.

The feedback information may comprise a recommended change of task. This is advantageous for use cases in which wearer fatigue or detrimental emotions may affect the wearer's ability to perform a task. In various examples, the wearer 400 may be an employee. The employee may be performing a safety-critical task, such as driving a vehicle, manufacturing or assembling safety-critical components, dealing with dangerous chemicals, or working in a nuclear power plant, etc.

For employee monitoring, the method 100 may comprise receiving a request for facial expression information. The request may comprise a continuous query as described above, or an on-spot query or history query. The request may be from a client application 514, which may be an employer-side client application or an employee-side client application. The request may be triggered by a determination of a task that the wearer 400 is currently performing, e.g. a determination that the user has started a job or work shift. The determination can be made using techniques such as: tracking the wearer's location using a location sensor; determining whether the wearable has been put on by the user; receiving information from a calendar application; or receiving a user input indicating that the user is performing the task. The method 100 of FIG. 1 may be performed in response to the request.

The method 100 may additionally comprise deciding whether to output feedback information recommending a change of task from the determined current task, in dependence on the determined facial expression information. The decision may be performed in the client application 514 or the server 500 of FIG. 6.

The decision may be based on emotional state information as described above. If the determined emotional state information has a first property or value (e.g. emotional class), the decision may be to loop the method 100 back (continuous query) or terminate (on-spot query, history query), and/or output feedback information indicating the emotional state. If the determined emotional state information has a second property or value (e.g. different emotional class), the decision may be to output feedback information recommending a change of task. Using the above 'fatigue' example, the first property/value may be not associated with fatigue and the second property/value may be associated with fatigue. In other examples, the decision could based on facial expression information without determining emotional state information.

The recommended change of task may comprise recommending temporarily or permanently ceasing the task, such as taking a break or stopping. If the wearable device 200 comprising the IMU 204 also comprises an audio speaker 210, the feedback information may be output to the audio speaker 210. This is convenient because the wearer does not need to be close to an external audio speaker and does not need to wear an audio speaker device separately. The feedback information may be configured to be output at headphone volume levels, so that other nearby users are not alerted to the feedback information. However, it would be appreciated that the feedback information may be provided to any appropriate output device.

In response to the recommended change of task, an employer can direct an employee to take a break or stop, or the wearer 400 can decide themselves to take a break or stop.

The recommended change of task does not have to recommend taking a break or stopping a task in all examples. For example, the user could be working through an itinerary of tasks (e.g. hobbies, cooking, watching television) and the recommendation could recommend when to change task based on emotional state. The recommended change of task could be to start or stop exercising, in a fitness-monitoring use case.

According to the above use cases, the recommendation is to change task. However, in additional or alternative use cases, the feedback information may comprise a recommended change in how a task is performed, without necessarily changing the task. Aside from giving different feedback, the steps involved could be otherwise the same as the above use cases for recommending a change of task, or may be different.

An example of changing how a task is performed includes optimizing a facial expression during a communication task. Facial expression is a very important form of non-verbal communication, arguably as important as the words chosen by the wearer 400. If the wearer's facial expression contradicts the image they are trying to convey, the feedback improves the user's ability to communicate.

A user may wish to optimize their facial expression during a high-pressure face-to-face communication task (e.g. job interview, sales interaction, doctor-patient interaction, meeting, funeral). A vision-based emotion tracking system using a camera may not be an available option because personal devices with cameras may need to be left in pockets. This makes a wearable IMU approach desirable. In other implementations, the communication may be video communication. For communication tasks, it may be impolite to keep turning to a personal device to make on-spot or history queries, therefore the ability to make continuous queries is advantageous for communication tasks.

Detecting that a user is performing a communication task may be as described above (e.g. location tracking, while-worn, calendar information, or manual input). The decision of whether to recommend a change in how a task is performed could use methods as described above (e.g. based on emotional state information or just facial expression information).

The recommended change in how a task is performed is not necessarily limited to communication tasks. For example, the recommended change in how a task is performed may comprise recommending an increase or decrease in intensity of a task such as exercise intensity, vehicle driving speed/acceleration, or other fatiguing tasks. The employee monitoring example may first recommend a change in intensity of a task before recommending a break if the emotional state does not improve.

Further examples will be described below in which the HMI function controlled by block 130 of the method 100 comprises an input function. For example, the client application 514 may interpret the facial expression information as an input command by the user, and may cause a device function to be controlled in dependence on the input command.

The input command may comprise at least one of: selection of an option provided by a user interface; navigation within a user interface; inserting objects (e.g. emoticons, text and/or images); changing a device power state (on, off, sleep); activating or deactivating a peripheral or subsystem, etc.

An example in which it would be useful to make inputs using facial expressions, is when a device with an input HMI is not conveniently accessible. For example, if a user is driving or in a meeting, they may be prohibited by law or discouraged by etiquette from using a personal device such as a mobile phone. The personal device may even be stowed away which precludes the use of vision-based emotion tracking if the personal device has a camera. The use of a wearable IMU 204 is advantageous in such situations.

The input command may control a hands-free device function. Hands-free functions include one or more of: accepting and/or denying incoming requests to commence a communication session (e.g. incoming voice/video call request); terminating a communication session (e.g. hanging up); replying to text-based communications (e.g. using SMS or instant messenger applications); changing a user status on an application (e.g. busy, free); listening to voicemail; changing a device setting (e.g. loud, silent, airplane); dismissing or deferring notifications (e.g. alarm, incoming text-based communication), etc.

In some examples, the hands-free function may be for a virtual assistant service. The hands-free function may be for instructing, or for responding to a query from a virtual assistant service. The interface for the virtual assistant service may be provided by a device such as the earable 201 that lacks a touch-based human-machine interface for interacting with the virtual assistant service and/or a graphical user interface.

In some, but not necessarily all examples, the input command is a first input command when the facial expression information is associated with a first facial expression, and the input command is a second (different) input command when the facial expression information is associated with a second (different) facial expression. For example, a first facial expression such as a smile could commence a reply or confirmation function (e.g. send acknowledgement of missed call, acknowledge alarm), and a second facial expression such as a frown could commence a dismiss function (e.g. dismiss notification of missed call, defer alarm). If the facial expression is neither of the above or cannot be determined, no facial-expression dependent action may be performed. In other examples, only one type of facial expression can be recognised, e.g. smile or not smile, or more than two recognizable facial expressions may provide more than two or three outcomes.

The methods described herein may be carried out by an apparatus 602 such as the apparatus 602 shown in FIG. 7A. The apparatus 602 may be provided in the wearable device 200 along with the IMU 204, or can be provided in a separate device 601 from the device that comprises the IMU 204. The device 601 may comprise an output device 612. The output device 612 may perform the functions of one or more of the output device(s) disclosed earlier. In other implementations, the output device 612 can be provided separately from the device 601.

Therefore, in one example there is provided a device 601 comprising the apparatus 602 and the IMU 204, and in another example, there is provided a system 600 comprising the apparatus 602 and separate IMU 204, coupled by wire or wirelessly. The system 600 may optionally comprise the output device 612.

The device 601 of FIG. 7A may optionally comprise:
one or more cameras (not shown), for example one or more front-face cameras and/or one or more rear-face cameras;
a user interface (not shown), such as a touch screen, buttons, sliders or other known underlying technology;
an input/output communication device (not shown) configured to transmit and/or receive data/information described herein, such as an antenna or wired interface.

The device 601 of FIG. 7A may be the personal device as mentioned herein. The device 601 may be configured to provide the electronic device function as mentioned herein. The device 601 may be a hand-portable electronic device 601. The hand-portable electronic device 601 may be a smartphone, tablet or laptop.

FIG. 7A illustrates an example of a controller 604. Implementation of a controller 604 may be as controller circuitry. The controller 604 may be implemented in hardware alone, have certain aspects in software including firmware alone or can be a combination of hardware and software (including firmware).

As illustrated in FIG. 7A the controller 604 may be implemented using instructions that enable hardware functionality, for example, by using executable instructions of a computer program 610 in a general-purpose or special-purpose processor 606 that may be stored on a computer readable storage medium (disk, memory etc) to be executed by such a processor 606.

The processor 606 is configured to read from and write to the memory 608. The processor 606 may also comprise an output interface via which data and/or commands are output by the processor 606 and an input interface via which data and/or commands are input to the processor 606.

The memory 608 stores a computer program 610 comprising computer program instructions (computer program code) that controls the operation of the apparatus 602 when loaded into the processor 606. The computer program instructions, of the computer program 610, provide the logic and routines that enables the apparatus to perform the method 100 illustrated in FIG. 1. The processor 606 by reading the memory 608 is able to load and execute the computer program 610.

The apparatus 602 therefore comprises:
at least one processor 606; and
at least one memory 608 including computer program code
the at least one memory 608 and the computer program code configured to, with the at least one processor 606, cause the apparatus 602 at least to perform:
receiving information from at least one inertial measurement unit configured to be worn on a user's head;
causing, at least in part, determining facial expression information in dependence on at least the received information; and
causing, at least in part, controlling a human-machine interface function in dependence on the facial expression information.

As illustrated in FIG. 7B, the computer program 610 may arrive at the apparatus 602 via any suitable delivery mechanism 614. The delivery mechanism 614 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 610. The delivery mechanism may be a signal configured to reliably transfer the computer program 610. The apparatus 602 may propagate or transmit the computer program 610 as a computer data signal.

Computer program instructions for causing an apparatus to perform at least the following or for performing at least the following: causing receiving information from at least one inertial measurement unit configured to be worn on a user's head; causing, at least in part, determining facial expression information in dependence on at least the received information; and causing, at least in part, controlling a human-machine interface function in dependence on the facial expression information.

The computer program instructions may be comprised in a computer program, a non-transitory computer readable medium, a computer program product, a machine readable medium. In some but not necessarily all examples, the computer program instructions may be distributed over more than one computer program.

Although the memory 608 is illustrated as a single component/circuitry it may be implemented as one or more separate components/circuitry some or all of which may be integrated/removable and/or may provide permanent/semi-permanent/dynamic/cached storage.

Although the processor 606 is illustrated as a single component/circuitry it may be implemented as one or more separate components/circuitry some or all of which may be integrated/removable. The processor 606 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 1 and 5 may represent steps in a method and/or sections of code in the computer program 610. The illustration of a particular order to the blocks does not necessarily imply that there is a required or preferred order for the blocks and the order and arrangement of the block may be varied. Furthermore, it may be possible for some blocks to be omitted.

A technical effect of the method 100 is an improved physiological sensor. This is because facial expressions convey physiological information about the person making the expression, and can cause a physiological reaction in those who can see the facial expression. The sensor is improved at least because unlike other physiological sensors, inertial measurement units do not require continuous direct contact with the user's skin, and are small, light and inexpensive for use in wearable accessories.

A technical effect of IMUs 204 in earables 201 is that IMUs 204 can enable services additional to facial expression information services. According to some, but not necessarily all examples, the apparatus and methods described herein may be configured to determine head pose information from earable IMU information, and provide the head pose information to an application. The application may comprise a virtual reality function, an augmented reality function, or a mixed reality function, configured to control a rendered gaze direction in dependence on the head pose information. Another potential application could comprise an attentiveness alerting function that can provide an alert when a head droops, for example during driving. In further examples, audio properties of audio rendered by audio speakers 210 of the earables may be controlled in dependence on earable IMU information.

In further examples, the apparatus and methods described herein may be configured to determine location information from IMU information, using dead reckoning for example. The location information may indicate a current location of the wearer and/or a path of navigation of the wearer. The application may comprise a map function, a direction-giving function, and/or a tracking function for tracking wearers (e.g. employees).

Where a structural feature has been described, it may be replaced by means for performing one or more of the functions of the structural feature whether that function or those functions are explicitly or implicitly described.

The capturing of data may comprise only temporary recording, or it may comprise permanent recording or it may comprise both temporary recording and permanent recording. Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur. The use of the term 'capture' in relation to an image relates to either temporary or permanent recording of the data of the image.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

In this description, causing, at least in part, control of an electronic device function may comprise directly controlling an input device and/or an output device and/or an actuator, or providing data to a requesting client to cause the client to control an input device and/or an output device and/or an actuator.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising:
   at least one processor; and
   at least one non-transitory memory storing instructions that, when executed with the at least one processor, cause the apparatus at least to:
   receive information from at least two inertial measurement units positioned inside respective earables configured to be worn on opposing sides of a user's head for multiple axis measurement, wherein the earables are configured to be embedded into auricles of the user's ears so that an output of the at least two inertial measurement units depends on movement or deformation of a part of the user's ears in contact with at least one of the earables; and
   cause, at least in part, determining facial expression information in dependence on at least the received information;
   wherein the at least two inertial measurement units are configured to detect contractions and relaxations of facial muscles of the user and to correlate movement of facial muscles forming facial expressions with movement or deformation of the part of the user's ears in contact with the at least one of the earables.

2. The apparatus of claim 1, wherein at least one inertial measurement unit comprises a gyroscope.

3. The apparatus of claim 1, wherein at least one inertial measurement unit is configured as part of the respective earable.

4. The apparatus of claim 1, wherein the facial expression information is determined in dependence on the information and on machine learning.

5. The apparatus of claim 4, wherein the machine learning comprises a machine learning algorithm comprising a neural network or a hidden Markov model.

6. The apparatus of claim 5, wherein the machine learning algorithm comprises one or more convolution layers and one or more long short term memory layers.

7. The apparatus of claim 1, wherein the instructions, when executed with the at least one processor, further cause the apparatus to: cause, at least in part, controlling an electronic device function in dependence on the facial expression information.

8. The apparatus of claim 7, wherein the controlling an electronic device function comprises controlling output of feedback information in dependence on the facial expression information, with an output device.

9. The apparatus of claim 8, wherein the feedback information comprises a recommended change of task.

10. The apparatus of claim 8, wherein the feedback information comprises a recommended change in how a task is performed.

11. The apparatus of claim 7, wherein the controlling an electronic device function comprises interpreting the facial expression information as an input command with the user, and causing the electronic device function to be controlled in dependence on the input command.

12. A system, comprising:
at least two inertial measurement units positioned inside respective earables configured to be worn on opposing sides of a user's head for multiple axis measurement, wherein the earables are configured to be embedded into auricles of the user's ears so that an output of the at least two inertial measurement units depends on movement or deformation of a part of the user's ears in contact with at least one of the earables; and
an apparatus, the apparatus comprising:
at least one processor; and
at least one non-transitory memory storing instructions that, when executed with the at least one processor, cause the apparatus at least to:
receive information from at least one inertial measurement unit; and
cause, at least in part, determining facial expression information in dependence on at least the received information;
wherein the at least two inertial measurement units are configured to detect contractions and relaxations of facial muscles of the user and to correlate movement of facial muscles forming facial expressions with movement or deformation of the part of the user's ears in contact with the at least one of the earables.

13. A method, comprising:
receiving information from at least two inertial measurement units positioned inside respective earables configured to be worn on opposing sides of a user's head for multiple axis measurement, wherein the earables are configured to be embedded into auricles of the user's ears so that an output of the at least two inertial measurement units depends on movement or deformation of a part of the user's ears in contact with at least one of the earables; and
at least in part, determining facial expression information in dependence on at least the received information;
wherein the at least two inertial measurement units are configured to detect contractions and relaxations of facial muscles of the user's head and to correlate movement of facial muscles forming facial expressions with movement or deformation of the part of the user's ears in contact with the at least one of the earables.

14. The method of claim 13, wherein the inertial measurement unit is configured as part of the respective earable.

15. The method of claim 13, wherein the facial expression information is determined in dependence on the information and on machine learning.

16. The method of claim 13, further comprising controlling an electronic device function in dependence on the facial expression information.

17. A non-transitory program storage device readable with an apparatus tangibly embodying a program of instructions executable with the apparatus to perform at least the following:
receiving information from at least two inertial measurement units positioned inside respective earables configured to be worn on opposing sides of a user's head for multiple axis measurement, wherein the earables are configured to be embedded into auricles of the user's ears so that an output of the at least two inertial measurement units depends on movement or deformation of a part of the user's ears in contact with at least one of the earables; and
at least in part, determining facial expression information in dependence on at least the received information;
wherein the at least two inertial measurement units are configured to detect contractions and relaxations of facial muscles of the user's head and to correlate movement of facial muscles forming facial expressions with movement or deformation of the part of the user's ears in contact with the at least one of the earables.

18. The non-transitory program storage device of claim 17, wherein the inertial measurement unit is configured as part of an earable.

19. The non-transitory program storage device of claim 17, wherein the facial expression information is determined in dependence on the information and on machine learning.

20. The non-transitory program storage device of claim 17, wherein the program instructions are further configured to cause the apparatus to, at least in part, control an electronic device function in dependence on the facial expression information.

* * * * *